(12) United States Patent
Pacurariu et al.

(10) Patent No.: US 9,426,339 B2
(45) Date of Patent: Aug. 23, 2016

(54) MODULAR CAMERA CORE AND MODULAR CAMERA EXPANSION SYSTEM

(71) Applicant: Lyve Minds, Inc., Cupertino, CA (US)

(72) Inventors: Mihnea Calin Pacurariu, Los Gatos, CA (US); David Hoenig, Los Gatos, CA (US); Andreas von Sneidern, San Jose, CA (US); Joseph Palmer, Cupertino, CA (US)

(73) Assignee: LYVE MINDS, INC., Cupertino, CA (US)

( * ) Notice: Subject to any disclaimer, the term of this patent is extended or adjusted under 35 U.S.C. 154(b) by 69 days.

(21) Appl. No.: 14/147,392

(22) Filed: Jan. 3, 2014

(65) Prior Publication Data
US 2015/0195431 A1 Jul. 9, 2015

(51) Int. Cl.
| | | |
|---|---|---|
| *H04N 5/225* | (2006.01) | |
| *G03B 17/08* | (2006.01) | |
| *H04N 5/232* | (2006.01) | |
| *H04N 101/00* | (2006.01) | |

(52) U.S. Cl.
CPC .............. *H04N 5/2252* (2013.01); *G03B 17/08* (2013.01); *H04N 5/2251* (2013.01); *H04N 5/2253* (2013.01); *H04N 5/2254* (2013.01); *H04N 5/23203* (2013.01); *H04N 5/23216* (2013.01); *H04N 2101/00* (2013.01)

(58) Field of Classification Search
CPC ... H04N 5/2251; H04N 5/2252; G03B 17/08; G03B 17/48; G03B 29/00; G03B 2217/00; G03B 2217/002
USPC ................................................. 348/373–375
See application file for complete search history.

(56) References Cited

U.S. PATENT DOCUMENTS

| | | | |
|---|---|---|---|
| 5,221,964 A * | 6/1993 | Chamberlain et al. ........ 348/373 |
| 7,327,396 B2 * | 2/2008 | Schultz et al. ............... 348/375 |
| 8,345,429 B2 | 1/2013 | Kim et al. | |
| 8,525,925 B2 | 9/2013 | Jannard | |
| 2004/0032506 A1 * | 2/2004 | Silverbrook et al. .... 348/207.99 |
| 2007/0090277 A1 | 4/2007 | Palmer et al. | |
| 2008/0164316 A1 | 7/2008 | Patel et al. | |

(Continued)

FOREIGN PATENT DOCUMENTS

KR 10-2010-0094076 A 8/2010

OTHER PUBLICATIONS

International Search Report dated Apr. 21, 2015 as received in Application No. PCT/US2014/072676.

(Continued)

*Primary Examiner* — Kelly L Jerabek
(74) *Attorney, Agent, or Firm* — Maschoff Brennan

(57) ABSTRACT

A modular camera expansion system for a modular camera capable of capturing digital video, audio, and photograph data, the modular camera expansion system comprising a processor, a connecting means configured to electrically and mechanically connect the processor to a processor of the modular camera, a user interface connected to the processor which is capable of initiating a process in the processor of the modular camera when the modular camera is connected to the modular camera housing, and a housing which houses the processor, connecting means and user interface, the modular camera expansion system being configured to couple with the modular camera to form an assembled camera whereby the user interface of the modular camera expansion system is used to operate the modular camera.

20 Claims, 10 Drawing Sheets

(56) References Cited

U.S. PATENT DOCUMENTS

| | | | |
|---|---|---|---|
| 2009/0201379 A1 | 8/2009 | Schultz et al. | |
| 2009/0316038 A1* | 12/2009 | Schmack et al. | 348/373 |
| 2010/0060747 A1* | 3/2010 | Woodman | 348/222.1 |
| 2010/0111489 A1* | 5/2010 | Presler | 386/52 |
| 2010/0165138 A1* | 7/2010 | Jannard | 348/222.1 |
| 2010/0165188 A1* | 7/2010 | Jannard | 348/375 |
| 2012/0044416 A1* | 2/2012 | Krachtus | H04N 1/00132 348/375 |

OTHER PUBLICATIONS

Written Opinion of the International Searching Authority dated Apr. 21, 2015 as received in Application No. PCT/US2014/072676.

\* cited by examiner

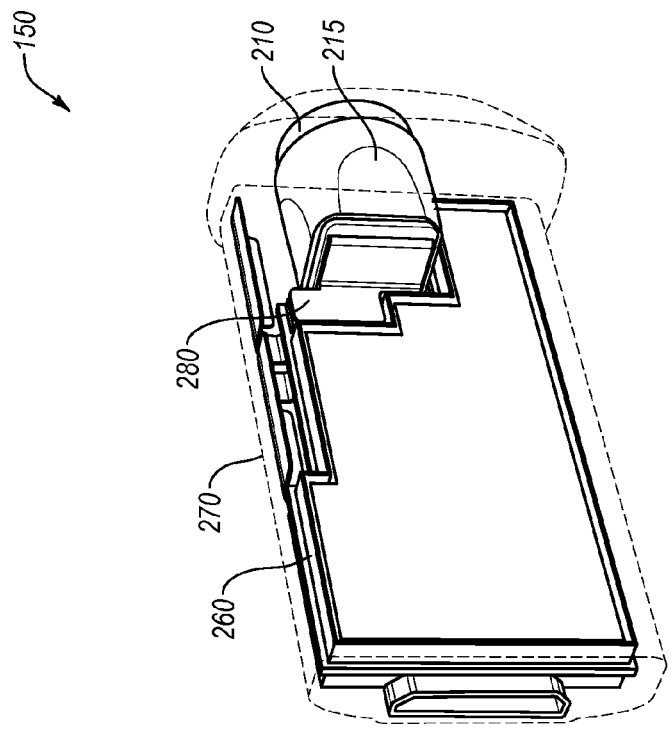
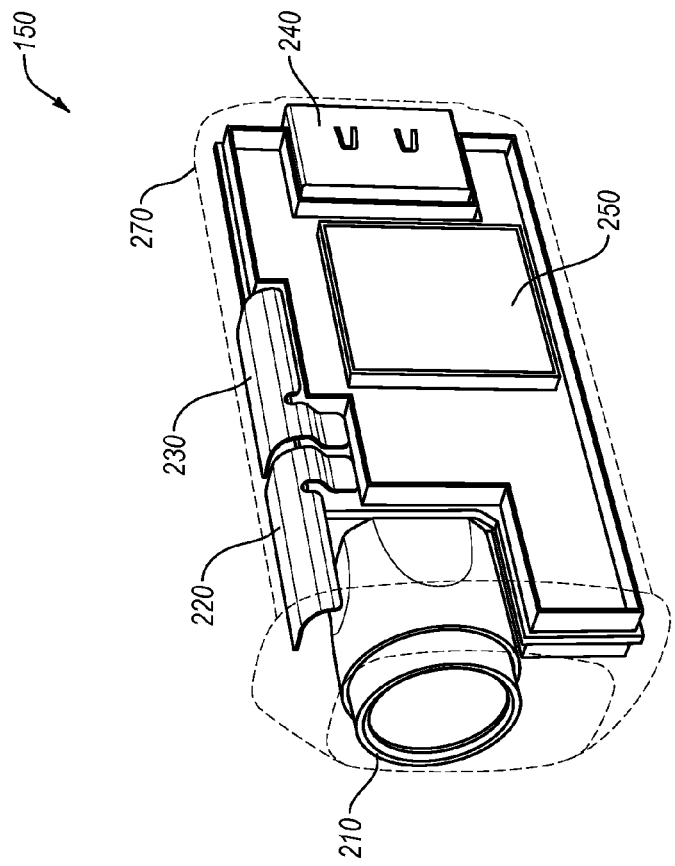

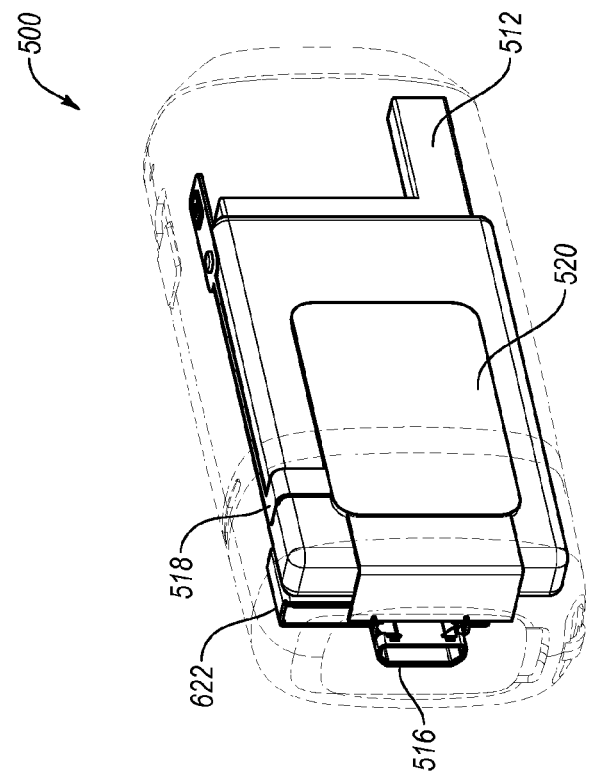
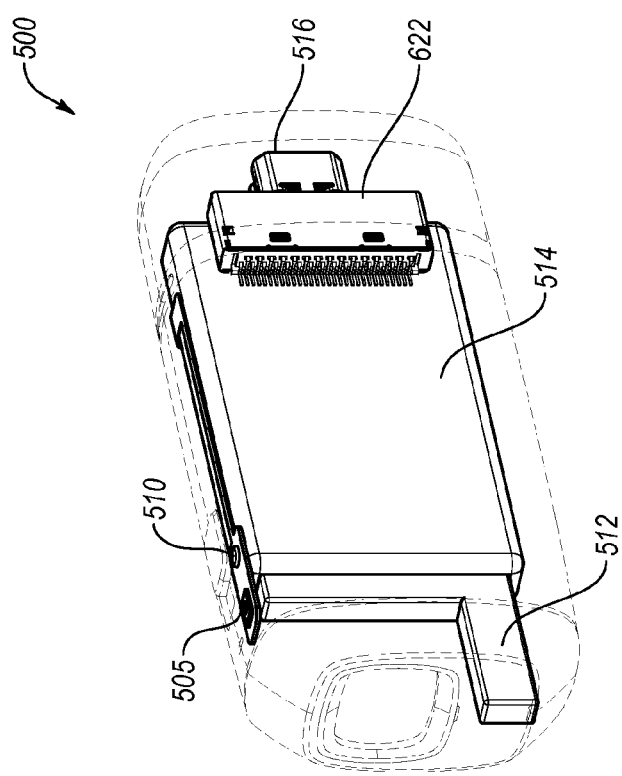

MODULAR CAMERA CORE AND MODULAR CAMERA EXPANSION SYSTEM

CROSS-REFERENCE TO RELATED APPLICATIONS

This application is related to U.S. patent application Ser. No. 14/147,396, filed Jan. 3, 2014, titled "Modular Camera Core," U.S. patent application Ser. No. 14/135,568, filed Dec. 19, 2013, titled "Image Orientation Adjustment Based on Camera Orientation," both of which are incorporated herein by reference in their entireties.

BACKGROUND OF THE INVENTION

1. The Field of the Invention

The present invention relates generally to a modular digital camera with a camera core and a modular camera expansion system which is configured to be used in a plurality of different camera configurations.

2. The Relevant Technology

As people become more and more interested in capturing digital photographs and digital videos, the proliferation of digital cameras has become more common. Cellular phones have evolved so as to include cameras which are capable of capturing digital video and digital photographs. Although these cameras provide various benefits because they are integrated with a device that many users already carry on a regular basis, there are various advantages to having a separate camera, including the ability to have a camera with higher quality components, improved controls, longer battery life, and which does not carry the security concerns that come with a cellular phone which also stores personal information.

Typically, the stand-alone digital cameras currently available in the market include simple "point and shoot" cameras which include a wholly integrated device which offer no modularity and which consequently require a user to select a single camera which will be suitable for a variety of situations, including which lens, features, and the like will be most easily adapted to a variety of situations. Generally, this forces consumers to find the best "over-all" digital camera, where the consumer sacrifices features and components that would be advantageous in some situations for the benefits of features and components that would be more commonly used. Other digital cameras include those which allow a user to remove specific components of the camera, including a flash, filter or lens. Generally, these cameras are more expensive and bulky.

Digital cameras include a series of functional components such as lenses, optical filters, one or more electronic image sensor arrays, electronic circuits to capture, process and store images from the image sensor array, internal or external memory devices to store and transfer image files, power supplies and a display system to preview the captured images. These components are typically integrated and interdependent, from each of an optical, electronics and physical perspective. As described above, in some instances, external lenses and power supplies may be attached to and removed from the camera, but the remaining components are typically permanently integrated into a main framework or housing without any practical ability to be removed and replaced. As a consequence, due to the limited configurability associated with conventional cameras, they are typically suitable for a limited range of applications and contexts. As a result, users who want to shoot in a variety of contexts and for a variety of applications often need to purchase multiple cameras to achieve desired results.

Thus, notwithstanding the various digital camera options available in the art, there remains a need for a camera system that is fully customizable by the user, and which overcomes the limitations discussed above.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

These and other limitations are overcome by embodiments of the invention which relate to a modular camera which is capable of capturing digital video and photograph data.

A first aspect of the invention is a modular camera housing for a modular camera capable of capturing digital video, audio and photograph data. The modular camera expansion system comprises a processor, a connecting means configured to electrically and mechanically connect the processor to a processor of the modular camera, a user interface connected to the processor which is capable of initiating a process in the processor of the modular camera when the modular camera is connected to the modular camera housing, and a housing which houses the processor, connecting means and user interface, the housing being configured to couple with the modular camera to form an assembled camera whereby the user interface of the modular camera expansion system is used to operate the modular camera.

A second aspect of the invention is a modular camera product capable being coupled to a modular camera capable of capturing digital video, audio, and photograph data. The modular camera expansion product comprises a processor, a connecting means configured to electrically and mechanically connect the processor to a processor of the modular camera, a user interface connected to the processor which is capable of initiating a process in the processor of the modular camera when the modular camera is connected to the modular camera expansion product, and a housing which houses the processor, connecting means and user interface, the housing being configured to couple with the modular camera to form an assembled camera whereby the user interface of the modular camera product is used to operate the modular camera.

A third aspect of the invention is a modular camera system for a modular camera capable of capturing digital video, audio, and photograph data. The modular camera product comprises a first modular expansion system comprising a first processor, a first housing, a first connecting means configured to electrically and mechanically connect the first processor to a processor of the modular camera, a first user interface connected to the first processor which is capable of initiating a process in the processor of the modular camera when the modular camera is connected to the first modular expansion system and a second modular expansion system comprising a second processor, a second housing, a second connecting means configured to electrically and mechanically connect the second processor to a processor of the modular camera, a second user interface connected to the second processor which is capable of initiating a process in the processor of the modular camera when the modular camera is connected to the second modular expansion system.

This Summary is provided to introduce a selection of concepts in a simplified form that is further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 2A-2B illustrate an example of various components of the modular camera core according to embodiments of the claimed invention described herein;

FIGS. 6A-6B illustrates an example of a connector for connecting the modular camera expansion system to a modular camera core according to embodiments described herein;

DETAILED DESCRIPTION OF THE PREFERRED EMBODIMENTS

The present invention relates generally to a modular digital camera with a camera core which is configured to be used in a plurality of different camera configurations.

Figure 1:
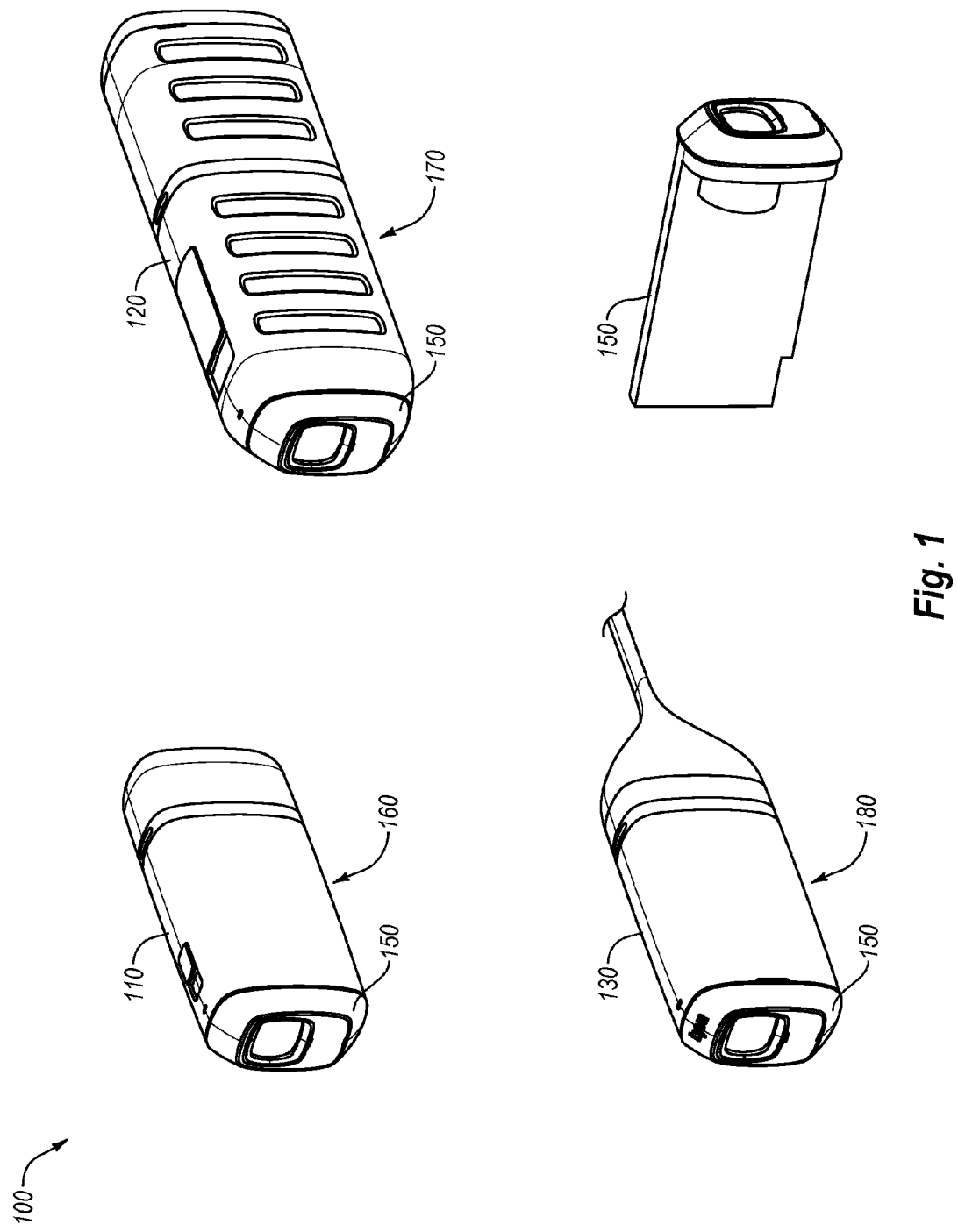
FIG. 1 illustrates a modular camera system and a modular camera core according to an embodiment of the invention.

As is shown in FIG. 1 of the drawings, embodiments described herein are directed to a modular digital camera system 100 which includes a modular camera core 150, which is configured to be coupled with a plurality of different other modular camera products, including a plurality of different modular camera expansion systems 110, 120, and so as to provide a user with a simple camera system which is capable of being specifically modified for a variety of uses.

In the example shown in FIG. 1, the modular digital camera system 100 includes the modular camera core 150, which as described more fully below, is capable of being coupled to a variety of different modular camera products, including the plurality of different modular camera expansion systems 110, 120, and 130 described more fully below. In this example, the modular camera core 150 is configured to couple with a modular pocket camera expansion system 110 which includes an assortment of features and controls which are designed to be useful in a variety of situations. When coupled with the modular pocket camera expansion system 110, the modular camera core 150 and modular pocket camera expansion system 110 together form a pocket camera 160 which is designed to be a general purpose camera which may be carried by a user on a regular basis and which may be used in a variety of situations which a user may encounter on a regular basis. The modular camera core 150 is also configured to couple with the modular active camera expansion system 120 which includes features and controls which are designed to be useful in an athletic or more active setting, such as while engaging in a sport or other recreational activity. When coupled with the modular active camera expansion system 120, the modular camera core 150 and the modular active camera expansion system 120 together form an active camera 170 which is specifically designed to have the various features that would be useful when capturing photograph, video, or audio data when engaging in a recreational activity. Additionally, the modular camera core 150 is also configured to couple with the modular cable camera expansion system 130 so as to form a cable camera configuration 180 which is designed to connect to a computer or other electronic device capable of communicating with the modular camera core 150 via a cable.

As will be illustrated more fully below, each of the various modular camera expansion systems 110, 120, and 130 have differing features and aspects, and one advantage of the embodiments described herein is the ability for a user to select the modular camera expansion system m110, 120, or 130 which best serves the immediate needs of the user. For example, when assembled, the pocket camera 160 may be lighter than the active camera 170, which may be advantageous for every-day use or in situations where simplicity and portability are desired. In contrast, when assembled, the active camera 170 has, for example, a larger battery life, a noise-cancelling microphone, and the ability to be coupled to a variety of mounts, including a dash mount, a bike mount, and/or a suction mount. Hence, while it may be larger and heavier, the active camera 170 has additional features which are not available in the pocket camera 160. Further, the cable camera configuration 180 is specifically designed to connect the modular camera core 150 to a computer or other electronic device so as to enable the transfer of pictures, audio data and/or video data, perform updates to the software operating on the modular camera core 150 or the like. Because the designated purpose of the cable camera configuration 180 is to facilitate the transfer of data to and from the modular camera core 150, the cable camera configuration 180 may have limited camera functionality. Conversely, because there is the designated modular cable camera expansion system 130, there is no need to provide a connection port in either the pocket camera 160 or the active camera 170. As may be understood, this provides an advantage since it allows the pocket camera 160 and the active camera 170 to have a simpler design.

Although the embodiments described herein describe three different modular camera expansion systems 110, 120, and 130, it should be understood that the examples described herein are meant to be illustrative only and that other modular camera expansion systems could be used in association with the modular camera core 150 described herein. As such, the examples described herein are not intended to be limiting of the claimed invention.

A. Modular Camera Core

FIGS. 2A-2B illustrate an example of the modular camera core 150 that may be used in association with the embodiments described herein. As is shown in the front view shown in FIG. 2A, the modular camera core 150 includes, for example, a camera lens 210 which may be used in capturing digital video and digital photograph and a lens holder 215 which holds the camera lens 210 in place (shown in FIG. 2B). The modular camera core 150 may also include a GPS antenna 220 which may be used in association with a space-based satellite navigation system that provides location and time information when the GPS antenna 220 communicates with one or more GPS satellites.

The modular camera core 150 also includes a Bluetooth and Wi-Fi antenna 230 which, as may be described more fully below, may be used to communicate with various other devices, including an external computing device, controls on the various modular camera expansion systems 110, 120, and 130, and the like. The modular camera core 150 also includes a pin receiver 240, which may be used to provide a physical connection with components of the various modular camera expansion systems 110, 120, and 130.

As is shown in FIG. 2B, the modular camera core 150 also includes a printed circuit board assembly (PCBA) 290 which mechanically supports and electrically connects electronic components using conductive tracks, pads and other features etched from copper sheets laminated onto a non-conductive substrate. Examples of components which may comprise a portion of the PCBA 290 are described in more detail with respect to FIG. 3. In addition to the PCBA 290, the modular camera core 150 may also include a heat spreader 250, a PCBA shielding 260, and a camera flex connection 280 which electrically connects the camera lens 210 to the PCBA 290.

A casing 270 houses the various components of the modular camera core 150 and may be formed of a material or a combination of materials so as to provide stability and security for the various components housed therein. The materials used for the casing may include a combination of plastics, metals, or other materials currently known in the art.

Figure 3:
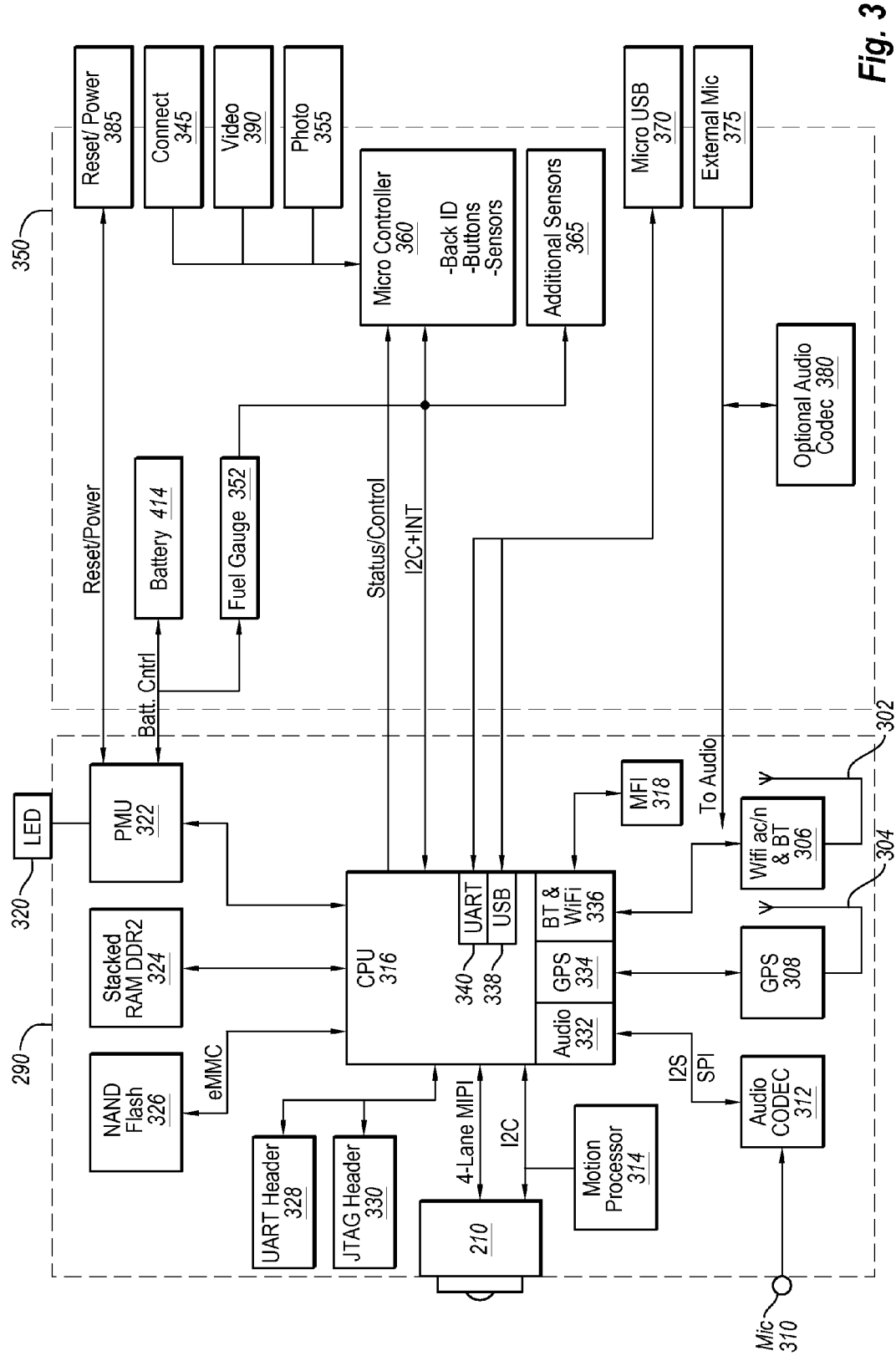
FIG. 3 is a block diagram illustrating various electrical components of the modular camera core and a corresponding modular camera expansion system according to embodiments described herein.
Figure 4A:
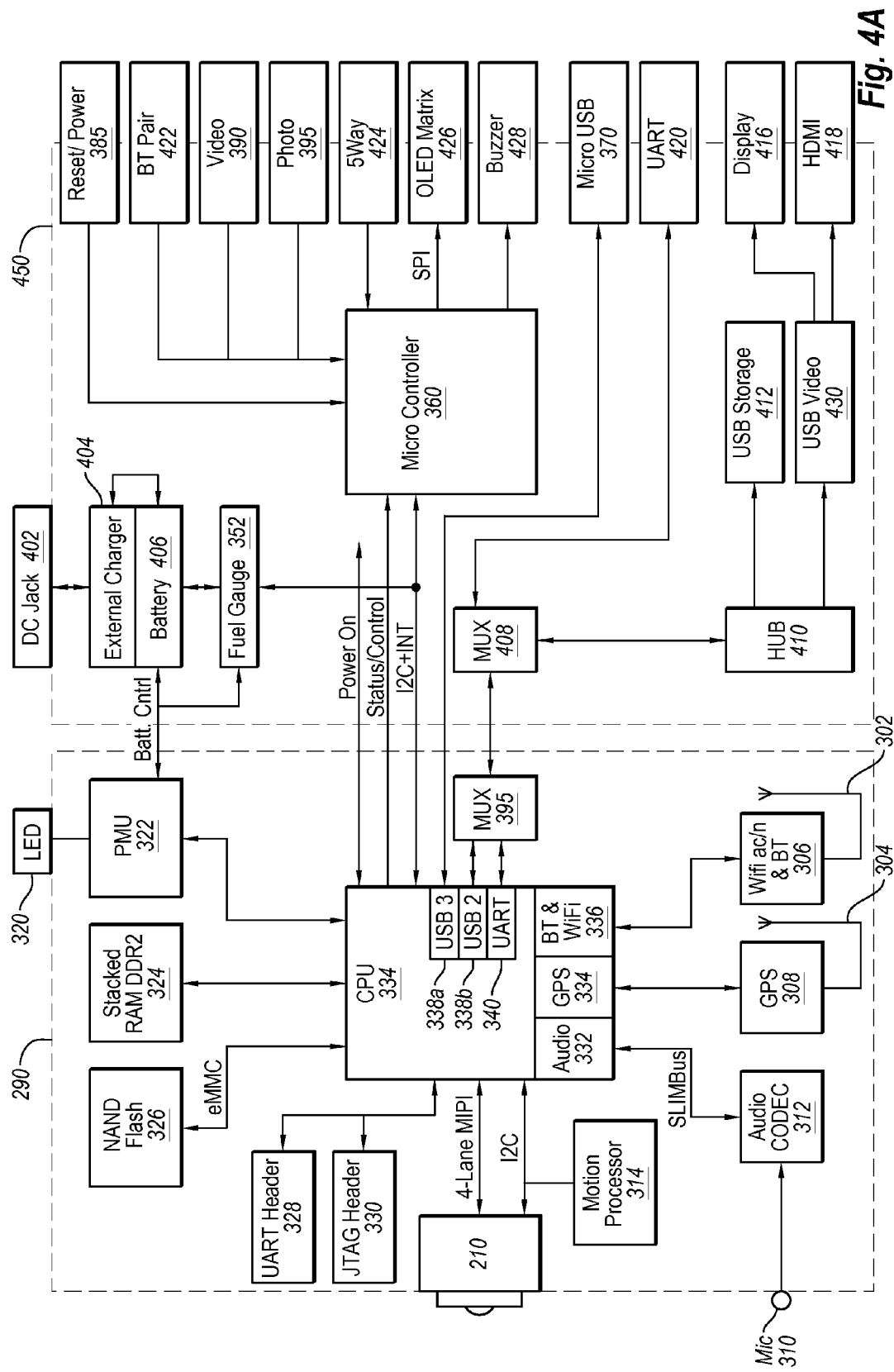
FIGS. 4A-4B are additional block diagrams illustrating various electrical components of the modular camera core and additional modular camera expansion system according to additional embodiments described herein.
Figure 4B:
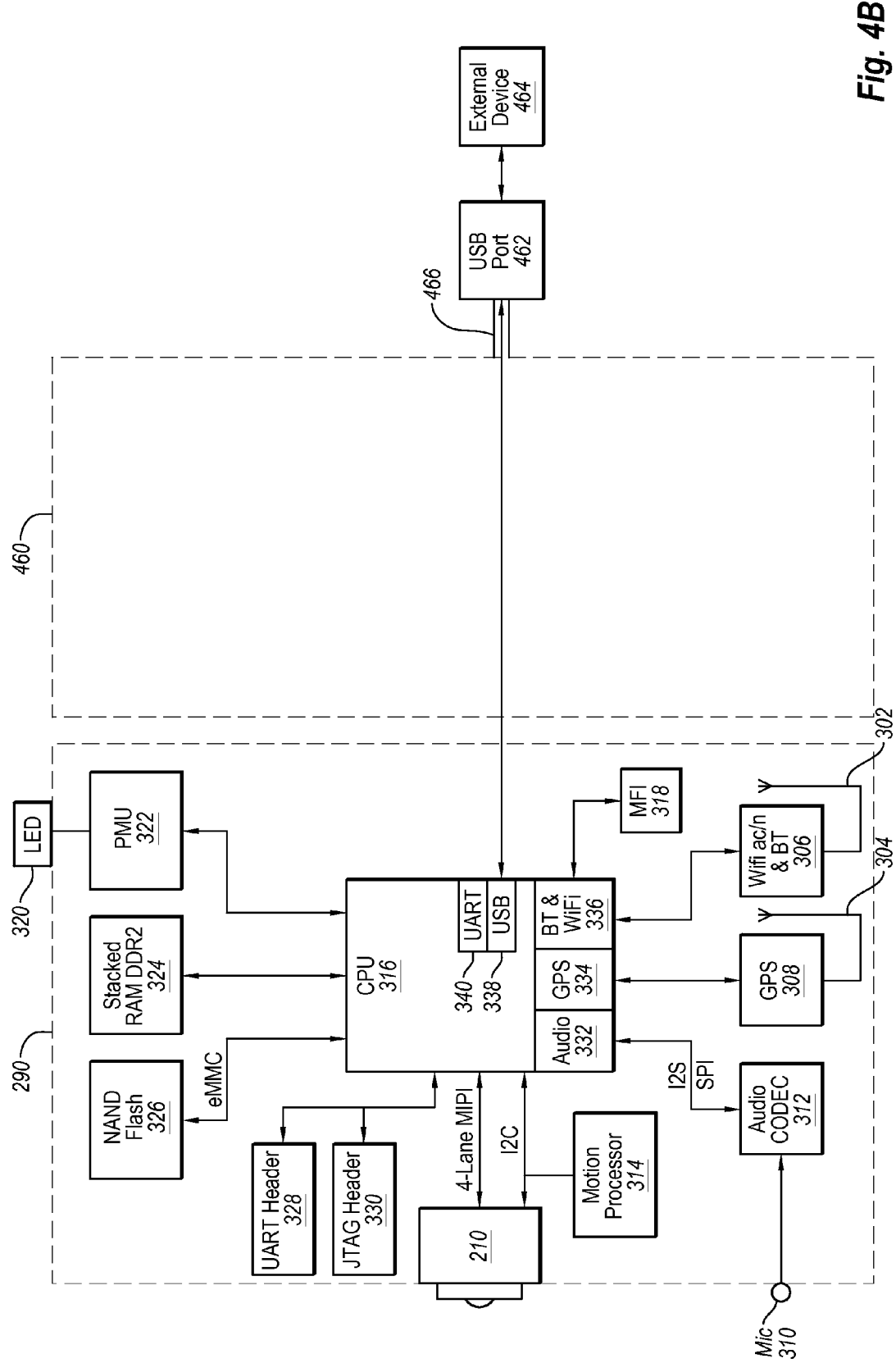
Figures 5A, 5B:
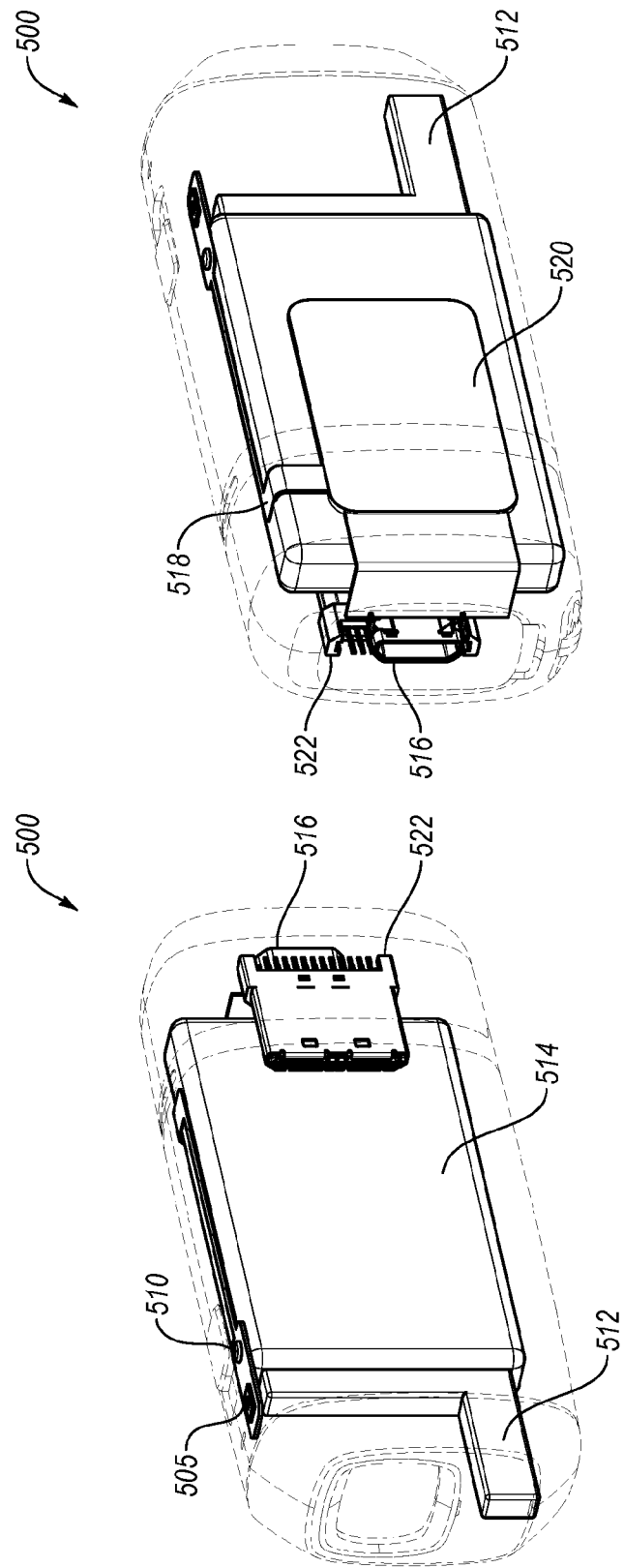
FIGS. 5A-5B illustrate an example of various components of a modular camera expansion system according to embodiments described herein.

FIG. 3 is a block diagram which illustrates an example of the various electrical components of the modular camera core 150 which may be integrated into or used in association with the PCBA 290. FIG. 3 also illustrates an example of the various electrical components of a modular camera expansion system 110 or 120 which may be integrated into or used in association with a PCBA 350 of the modular camera expansion system 110 or 120, which is also illustrated in FIGS. 5A-5B and described more fully below. FIG. 4A is a block diagram which illustrates the various electrical components of the modular camera core 150 when used in association with an alternative embodiment of the modular cable camera expansion system 450 which illustrates a vast array of different features which could be used in association with the modular camera core. FIG. 4B is a block diagram which illustrates the various electrical components of the modular camera core 150 when used in association with the modular cable camera expansion system 130.

The PCBA 290 includes a CPU 316 or other microprocessor or microcomputer that carries out the instructions of a computer program by performing the basic arithmetical, logical, and input/output operations of the system. As is shown in FIG. 3, the CPU 316 is connected to a variety of different components and controls the various components. In this example, the CPU 316 communicates with the camera lens 210 via a 4-lane MIPI or other form of interface and may also be connected to a motion processor 314 which may perform sub-processing routines, including powering components, such as an accelerometer, compass, and/or gyroscope and performing processing based on the data collected from those components to provide 9-axis motion processing. Further, the CPU 316 may include a camera module, not shown, which is specifically designed to control the exchange of data between the CPU 316 and the camera lens 210.

The PCBA 290 is also connected to a microphone 310 via an audio CODEC 312 which may be used to configure digital audio data captured by the microphone 310 according to a given audio file format or streaming media audio format. This digital audio data is then sent to an audio module 332 of the CPU 316 for compressing and decompressing, as necessary. As briefly described with respect to FIGS. 2A-2B, the CPU 316 is also connected to a GPS antenna 304 via a GPS module 308, which may be used to perform telemetry or other location or positioning processing. The GPS data may then be sent to a GPS module of the CPU 316. The CPU 316 is also connected a Wi-Fi and/or Bluetooth antenna 302 via a Wi-Fi and Bluetooth module 306. The CPU 316 may also include a MFi module 318 so as to enable the CPU 316 and the modular camera core 150 to connect with Apple® brand products. The data from the MFi module 318, and the Bluetooth and Wi-Fi data from the Wi-Fi and Bluetooth module 306 may be sent to a Bluetooth and Wi-Fi module 306 of the CPU 316 for further processing and, in some instances as described more fully below, to initiate control operations.

As may be understood by one of skill in the art, by performing a subset of the processing at the modules 314, 312, 306, and 308, the amount of processing performed by the CPU 316 is reduced, resulting in increased battery life of the system. In other configurations, the processing may be performed by modules within the CPU 316.

The CPU 316 may also include a Universal Serial Bus (USB) port 338 for connecting to an external device and/or the PCBA 350 of the modular camera expansion system and a Universal Asynchronous Receiver/Transmitter (UART) 340 which translates data between parallel and serial forms. The USB port may also include a micro USB port, mini USB port or other connection means currently known in the art. In other embodiments, the CPU may also include dual USB ports, such as 338a and 338b and/or a multiplexer 395 shown in FIG. 4A.

The modular camera core 150 may also include an LED light 320 which is controlled by a Power Management Unit (PMU) 322. The PMU 322 may be powered by a battery 414 stored in a modular camera expansion system 110 or 120. The modular camera core 150 may also include various types of memory, including ROM, RAM 324, and flash memory 326 which may be used to store various types of data including stored video and picture captured by the system. Further, the modular camera core may include other components such as a JTAG header 330 for testing the PCBA 290 and a UART header 328.

In the embodiments described herein, the modular camera core 150 includes various features including a camera 210 which is capable of capturing digital video, audio data and photographs. The digital video may be captured in a variety of resolutions, including 1080p60, 720p120, 480p240 format, and in 8-13MP stills, although it should be understood that a variety of resolutions may be used in association with the embodiments described herein. In one embodiment, the camera 210 includes a fixed focus lens although the embodiments described herein may be adapted to include variable focus lens and other optical components. The camera 210 may also include a temporary flash which may be powered by the battery 414 of the corresponding modular camera expansion system 110 or 120.

B. Controlling the Modular Camera Core

As will be described more fully below, in one embodiment, the modular camera core 150 is designed without a separate power supply and without an integrated user interface. Rather, these elements are designed to be incorporated in the modular camera expansion system 110, 120, or 130, and the modular camera core 150 is designed to be controlled remotely by an external computing device which is capable of communicating with the modular camera core 150 via the Bluetooth or Wi-Fi connection. In some instances, the Bluetooth connection may be used to control the features of the modular camera core 150 while the Wi-Fi connection is used to transfer data between the memory of the modular camera core 150 and the external device.

As may be understood, one advantage of enabling external control is that the camera, such as when incorporated into the pocket camera 160 or the active camera 170 may be mounted by a user who then can use his or her cellular phone or other device capable of communicating with the modular camera core 150 of the pocket camera 160 or the active camera 170 to control the device. In some instances, this may include using the external device as a viewfinder, which is capable of receiving streaming data from the modular camera core 150 to determine what the camera is currently viewing. As may be understood, such a configuration would enable a photographer to use an external device to compose, and in many cases to focus, the picture. This is particularly advantageous in instances where the photographer desires to be in the picture itself or in instances where the camera is going to be used in a sports setting where the photographer does not want to risk the possibility of a viewfinder being damaged or the additional bulk and controls necessary to operate the camera, but where the photographer still wants to exert control over the picture or video being captured. Additionally, the remote control would also be advantageous in situations where the photographer wishes to be positioned separate from the camera because he or she is unable to fit in the space where the camera is positioned or in other instances where the safety of the photographer requires the photographer to be located remotely from the camera.

Further, the external control may also be used to delete data stored in the memory of the modular camera core 150 or to transfer data from the memory from the modular camera core 150 or between different types of memory within the modular camera core 150 and the modular camera expansion system 110 or 120. The external control may also add metadata to video or photograph data including adding metadata corresponding to information collected from other components of the modular camera core 150 including GPS information from the GPS module 308.

The external control may also be used to transfer video or photograph data to a user network via the Wi-Fi connection. In some instances, this may include transferring the video or photograph data to a storage network, such as the storage network described in copending patent application 14/137,654 entitled "Storage Network Data Allocation," filed Dec. 20, 2013, which is herein incorporated by reference in its entirety.

In another configuration, the external control may be used to perform basic camera functions, such as setting flash settings, initiating the capture of a photo and the starting or stopping of a video recording. In addition or in the alternative, some of these features may be initiated using a button on the corresponding modular camera expansion systems 110 or 120. Further, the external control may also be used to mark video highlights. Additionally, embodiments described herein may also perform pass-through control of external devices, such as motor heads, lights, etc., which are connected to or in communication with the modular cameras 160 or 170.

In addition to controlling operations of the modular camera core 150, the modular camera expansion systems 110, 120, and 130 may also be controlled remotely via the Bluetooth or Wi-Fi connection.

C. The Modular Camera Expansion Systems

FIGS. 3 6 are exemplary figures which illustrate the components of modular camera expansion systems 110, 120, and 130. More specifically, as described briefly above, FIG. 3 is a block diagram illustrating the various components of the PCBA 290 of the modular camera core 150 and some exemplary components of the PBCA 350 of the modular pocket camera expansion system 110 or the modular active camera expansion system 120. FIG. 4A is a block diagram which illustrates the various electrical components of the modular camera core 150 when used in association with an alternative embodiment of the modular cable camera expansion system 450 which illustrates vast array of different features which could be used in association with the modular camera core 150. FIG. 4B is a block diagram illustrating the various components of the CPU 316 of the modular camera core 150 and some exemplary components of the PCBA 350 of the connector modular cable camera expansion system 130. FIGS. 5A-5B illustrate various components of an exemplary modular pocket camera expansion system 110 or the modular active camera expansion system 120 and FIG. 6 illustrates various components of an exemplary connector which is used to provide a physical and electronic connection between the modular camera expansion systems 110, 120, and 130 with the modular camera core 150.

Returning to FIG. 3, which illustrates exemplary components of the PCBA 350 which may comprise a component of either the modular pocket camera expansion system 110 or the modular active camera expansion system 120. As described more fully below, one distinction between the modular pocket camera expansion system 110 and the modular active camera expansion system 120 is the size and capacity of the battery included in the respective modular expansion systems 110 and 120 and many components of the two modular camera expansion systems 110 and 120 are similar. As such, the modular camera expansion system shown in FIG. 3 and FIGS. 5A-5B is shown as a generic modular camera expansion system 500 which includes exemplary components which may be included or excluded from the different modular camera expansion systems 110 and 120 depending on the specific design of the individual modular camera expansion system 110 or 120.

The generic modular camera expansion system 500 of FIGS. 5A-5B includes a video record slider switch 510 which may be used to initiate the capture of a digital video data. As is shown in FIG. 5B, the video record slider switch 510 is connected to a video record slider switch flex 518, which is in turn connected to the modular camera expansion system PCBA 520 which operates to control the camera lens 210 and the motion processor 314 to initiate the capture of data. In an alternative embodiment, the video record slider switch flex 518 may be eliminated.

In some instances, sliding the video record slider switch 510 may initiate the capture of the digital video data and a second sliding operation of the video record slider switch 510 may terminate the video capture. In another configuration, the video record slider switch 510 may be configured to capture the digital video for the duration of the period at which the slider switch is held. As is shown in FIG. 1, the video record slider switch 510 may also be made out of different materials, depending on the configuration of the modular camera expansion system 110 or 120. For example, in the modular pocket camera expansion system 110, the video record slider switch 510 may be made from a polished metal material to provide a sleek overall look whereas in the modular active camera expansion system 120, the video record slider switch 510 is made from a durable plastic material that is specifically designed to be used when an operator is wearing gloves or other materials typically worn during a recreational activity.

The generic modular camera expansion system 500 of FIGS. 5A-5B also includes a photo capture button 505 which may be used to initiate the capture of a digital photograph. The generic modular camera expansion system 500 may also include a battery 514 and battery protection circuitry 512.

In one embodiment, the battery 514 of the modular active camera expansion system 120 is designed to have greater battery life than the battery 514 of the modular pocket camera expansion system 110. For example, the battery of the modular pocket camera expansion system 110 may be 45-60 minutes whereas the battery life of the battery 514 of the modular active camera expansion system 120 may be two or more hours. Furthermore, the battery 514 of the modular active camera expansion system 120 may be designed to be replaceable.

The generic modular camera expansion system 400 of FIGS. 5A-5B also includes a pin connection 522 for connecting to the corresponding pin connection of the modular camera core 150. In one embodiment, the pin connection 522 is a proprietary 30-pin connection, although it should be understood that a plurality of different connection methods may be used without departing from the scope and meaning of the claimed invention.

FIG. 3 illustrates the various electrical components of the generic modular camera expansion system 500. In the example shown in FIG. 3, many elements shown may be selectively included in the various modular camera expansion systems 110 or 120. For example, an external noise-cancelling microphone 375 and an accompanying audio CODEC 380 may be included in the modular active camera expansion system 120, but excluded from the modular pocket camera expansion system 110 and the modular cable camera expansion system 130. Similarly, the micro USB port may be included in the modular pocket camera expansion system 110 and the modular active camera expansion system 120, but excluded from the modular cable camera expansion system 130, shown in FIG. 4B since the modular cable camera expansion system 130 may be configured to integrate the micro USB port or utilize an additional type of cable for data transfer.

Additionally, as described above, while the modular pocket camera expansion system 110 and the modular active camera expansion system 120 include the battery 414, the modular cable camera expansion system 130 shown in FIG. 4B does not include the battery 414 or an accompanying fuel gauge 352 which is used to determine how much battery life remains in the battery 414.

The PCBA 350 of the generic modular camera expansion system 500 includes a microcontroller 360 for controlling the various buttons and sensors of the generic modular camera expansion system. Further, the PCBA 350 may also include additional sensors 365, including a detector for detecting the external noise of the area so as to initiate the noise cancelling features of the external microphone 375. As is described above, the generic modular camera expansion system 500 may be connected to the video record slider switch 510 (shown as video switch 390 in FIG. 3) and a photo capture button 505 (shown as photo switch 355 in FIG. 3). In another embodiment, the generic modular camera expansion system may also include a connect button (shown as connect button 345 in FIG. 3) which would initiate the transfer of video and/or photo data to an external device.

FIG. 4A illustrates the various electrical components of the modular camera core 150 when used in association with an alternative embodiment of a modular camera expansion system 450 which illustrates vast array of different features which could be used in association with the modular camera core 150. For example, in the modular camera expansion system 450, which is included to show the modularity available with the variety of modular cable camera expansion systems which may be individually selected in order to assemble a modular camera with the desired features. The modular expansion system 450 includes a vast array of components and is nick-named "Frankie" because it represents a vast assembly of available features.

More specifically, in addition to the components previously described, the "Frankie" modular camera expansion system 450, also includes a variety of features, including a battery 406, which is connected to a DC jack 402 which may be charged externally via an external charger 402. The "Frankie" modular camera expansion system 450 also includes a multiplexer 408, a Bluetooth pair 422, a five-way switch 424 which is configured to be pushed in 4 directions, or straight down, a OLED matrix 426 for driving a display device, a buzzer 428, or other piezoelectric element which may provide a vibration as a notification to a user.

Additionally, the multiplexer 408 may be connected to a hub 410 which in turn is connected to a USB storage port 412 which is configured to receive a USB memory stick, a USB video port 430 which may be connected to a HDMI port 418 for driving an external display or a display 416 which is included in the "Frankie" modular camera expansion system 450.

Figure 9:
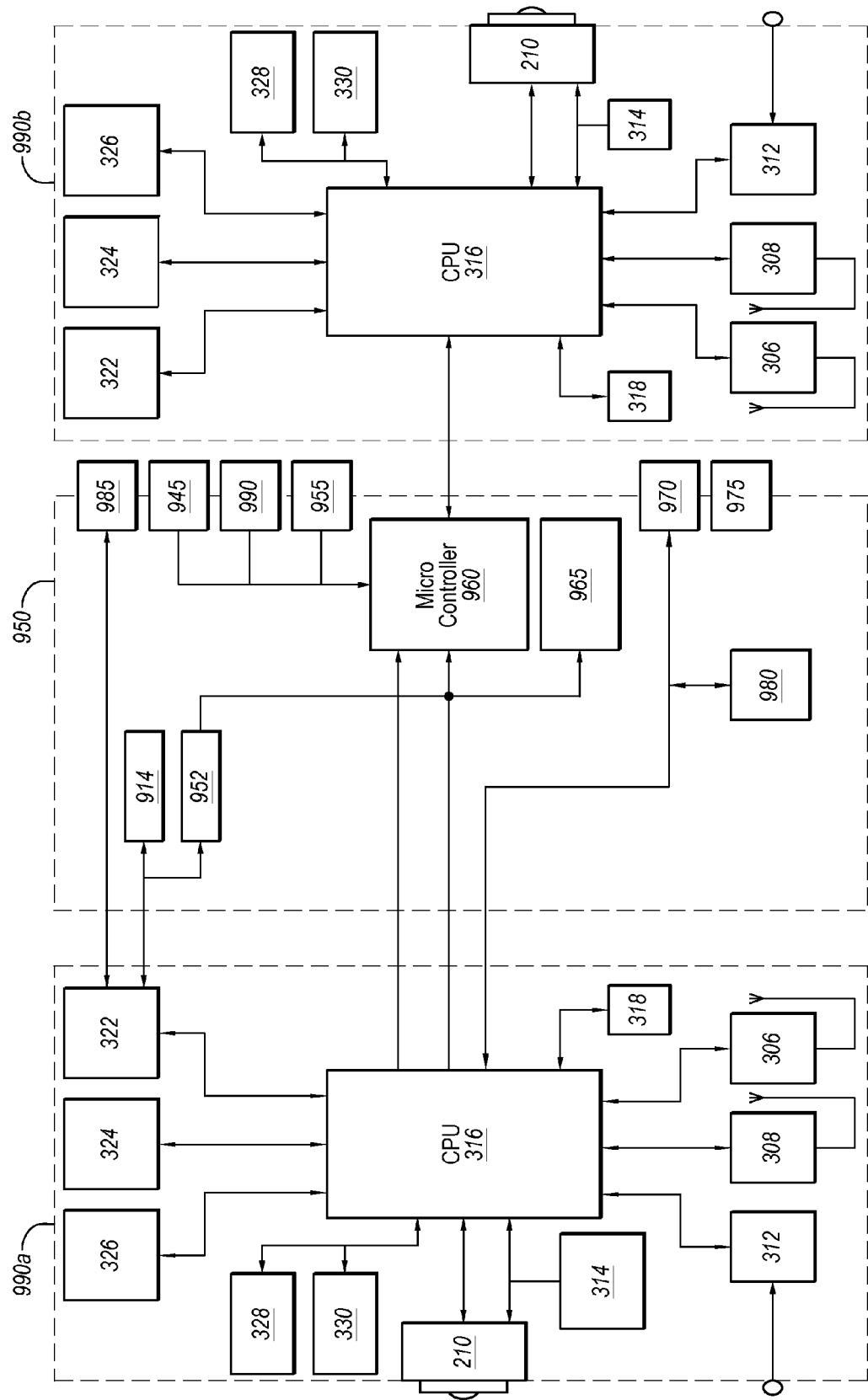
FIG. 9 is a block diagram which illustrates the ability of the modular camera expansion system to be connected to and to control a plurality of modular cameras according to an alternative embodiment of the invention.

In addition to these components, other components may be added to the modular camera expansion systems without departing from the scope of the invention. For example, a port may be provided for external flash memory, and as is shown in FIG. 9, a modular camera expansion system 950 with its accompanying microcontroller or CPU 960 may be configured to control more than one modular camera core 990a and 990b.

More specifically, the modular expansion system 950 may also include a battery 914 which powers a PMU 322 of each of the modular camera cores 990a and 990b. The battery 914 may be associated with a fuel gauge 952. The modular expansion system 950 may include the variety of components described above, including a microcontroller 960, an external noise-cancelling microphone 975 and an accompanying audio CODEC 980, a micro USB port 970, additional sensors 965, including a detector for detecting the external noise of the area so as to initiate the noise cancelling features of the external microphone 3975.

As is described above, the modular camera expansion system 950 may also include a reset button 985, a connect 945 button for initiating a transfer of data via the USB port 970, a video button 960 for initiating the capture of video data from either or both of the camera lenses 210 of the modular camera cores 990*a* and 990*b*, and a photo capture button 965 for initiating the capture of photo data from either or both of the modular camera cores 990*a* and 990*b*.

In contrast to the multi-component modular cable camera expansion system 450 shown in FIG. 4A, FIG. 4B illustrates exemplary components of the modular cable camera expansion system 130 which merely includes a pass-through connection between an external device 464 via a USB connector 462 connected to the modular cable camera expansion system 130 via wiring 466. The modular cable camera expansion system 130 is specially designed to facilitate in the transfer of data between the modular camera core 150 and an external device 464. In this embodiment, the modular cable camera expansion system 130 does not include a micro controller or other electrical components.

The modular cable camera expansion system 130 includes a USB port 455 or other communication interface commonly known in the art. In this instance, the USB connection is used for connection, communication, and power supply between the external device 464 and the modular camera core 150. Because the USB port 455 enables the external device 460 to supply power to the modular camera core 150 via the CPU 316, the modular cable camera expansion system 130 does not include the battery 414.

In each of the modular camera expansion systems 110, 120 and 130 described above, in addition to the buttons and sliders specifically described, any of the buttons or sliders on the various modular camera expansion systems 110, 120, and 130 may be also used to reset or power on or off the pocket camera 160, active camera 170, or cable camera configuration 180. For example, holding down a photo capture button 405 or a connection button for a predetermined period of time or some combination of pressing the photo capture button 405 and sliding the video record slider switch 510 may be used to imitate such an operation and a reset/power detector 385 may be used to detect such an operation.

In addition to these electrical components, other physical features may be included in the various modular camera expansion systems 110, 120, and/or 130, depending on their intended use. For example, the modular camera expansion systems 110, 120 and/or 130 may include connections for attaching the modular camera expansion systems 110 and 120 to a lanyard, clip, or a key holder, or as described above to a variety of different mounts. Using this combination of specialized mechanical and electrical components, the various modular camera expansion systems 110, 120, and 130 can be specially designed for a variety of camera applications. Further, in one embodiment, the modular camera expansion system 110 or 120 may include a flexible clip mount which enable the pocket camera 160 or the active camera 170 to be mounted to a piece of clothing while allowing the camera lens 210 to point forward. In one embodiment, the modular camera core 150 of any of the modular camera expansion systems 110, 120, and 130 are each designed to be waterproof or water resistant.

FIGS. 6A and 6B illustrate the pin connection between the modular camera expansion systems 110, 120 and 130 and the modular camera core 150. More specifically, as shown in FIG. 6A a pin receiver 240 of the modular camera core 150 is adapted to receive a pin connector 622 disposed on each of the modular camera expansion systems 110, 120, and 130. As may be understood by those of skill in the art, the pin receiver 240 and the pin connector 622 may be specifically adapted to provide a mechanical and electrical connection and communication between the modular camera core 150 and the modular camera expansion systems 110, 120, and 130. In one embodiment, the pin connector 622 is a proprietary 30 pins although it should be understood that alternate embodiments or configurations may be used without departing from the meaning or scope of the claims.

Figure 8:
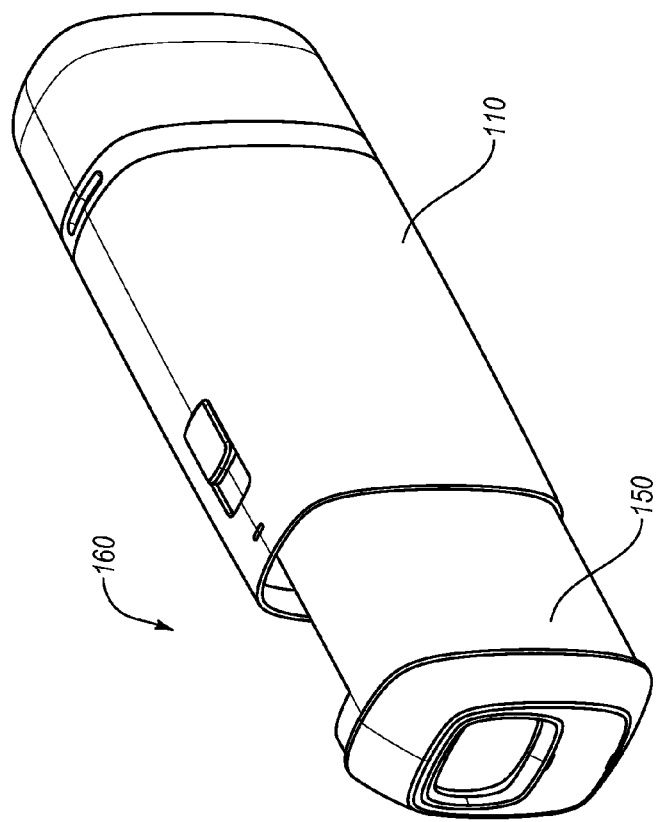
FIG. 8 illustrates an assembled modular camera assembly according to an embodiment described herein.

FIG. 8 illustrates the process wherein the modular camera core 150 is coupled to modular pocket camera expansion system 110 to form the assembled pocket camera 160. As is shown in FIG. 8, the modular pocket camera core 150 slides into a housing of the modular camera expansion system 110 and the two components are joined mechanically and electrically by their respective pin connections 240 and 522. In some instances, the modular pocket camera expansion system 110 may include a button or other mechanism for intimating the release of the modular camera core 150 from the modular pocket camera expansion system 110.

Figure 7:
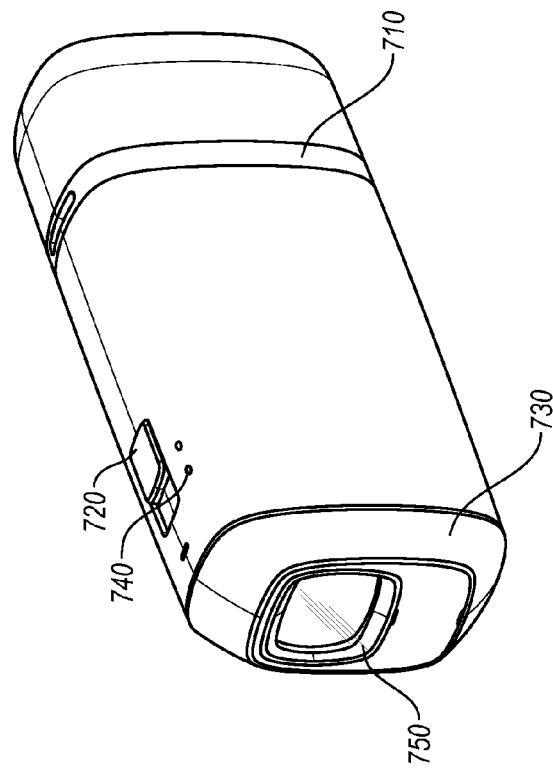
FIG. 7 illustrates the assembly of the modular camera assembly according to an embodiment described herein.

FIG. 7 illustrates the various aspects of the assembled pocket camera 160 according to one embodiment. The assembled pocket camera 160 includes the video record slide button and a photo capture button 720 which are integrated in this embodiment. A tapered front of the assembled pocket includes a metal bezel and a metal band 710 is formed at a rear of the assembled pocket camera 160. LED indicators 740 on the top of the assembly indicate that the camera is powered on and/or that a recording is in progress or that a data transfer is in process. A crystal cover 750 is placed over the front of the camera lens 210 so as to provide clear pictures and video while providing durability.

By providing the various modular components described herein, the modular camera system described herein provides a camera which may be easily adapted for a variety of different purposes. For example, specific modular camera expansion systems 110 and 120 may be selected which provide differing user interfaces, physical attributes, electrical components, and battery life that are better suited for a variety of situations. Further, the additional modular cable camera expansion system 130 may be used that is specifically designed for data transfer.

In some instances, a user may purchase a variety of different modular camera expansion systems 110, 120, and 130 with the modular camera core 150. In one embodiment, the modular camera core 150 may be sold together with the three separate modular camera expansion systems 110, 120, and 130. In another embodiment, the modular camera core 150 may be sold with only one modular camera expansion system 110, 120, or 130, with the other modular camera expansion systems being sold separately. As may be understood, by enabling this modularity, the system described herein offers a degree of personalization and adaptability which is not currently known in the art.

Further, by providing the central modular camera core 150, embodiments described herein allow for further modular camera expansion systems to be developed and offered for sale which include new features or components, which would enable a user to upgrade or further personalize his or her modular camera without having to purchase an entirely new camera system. By providing the level of modularity and customization described herein, the embodiments described herein provide advantages not currently known in the art.

Figure 10:
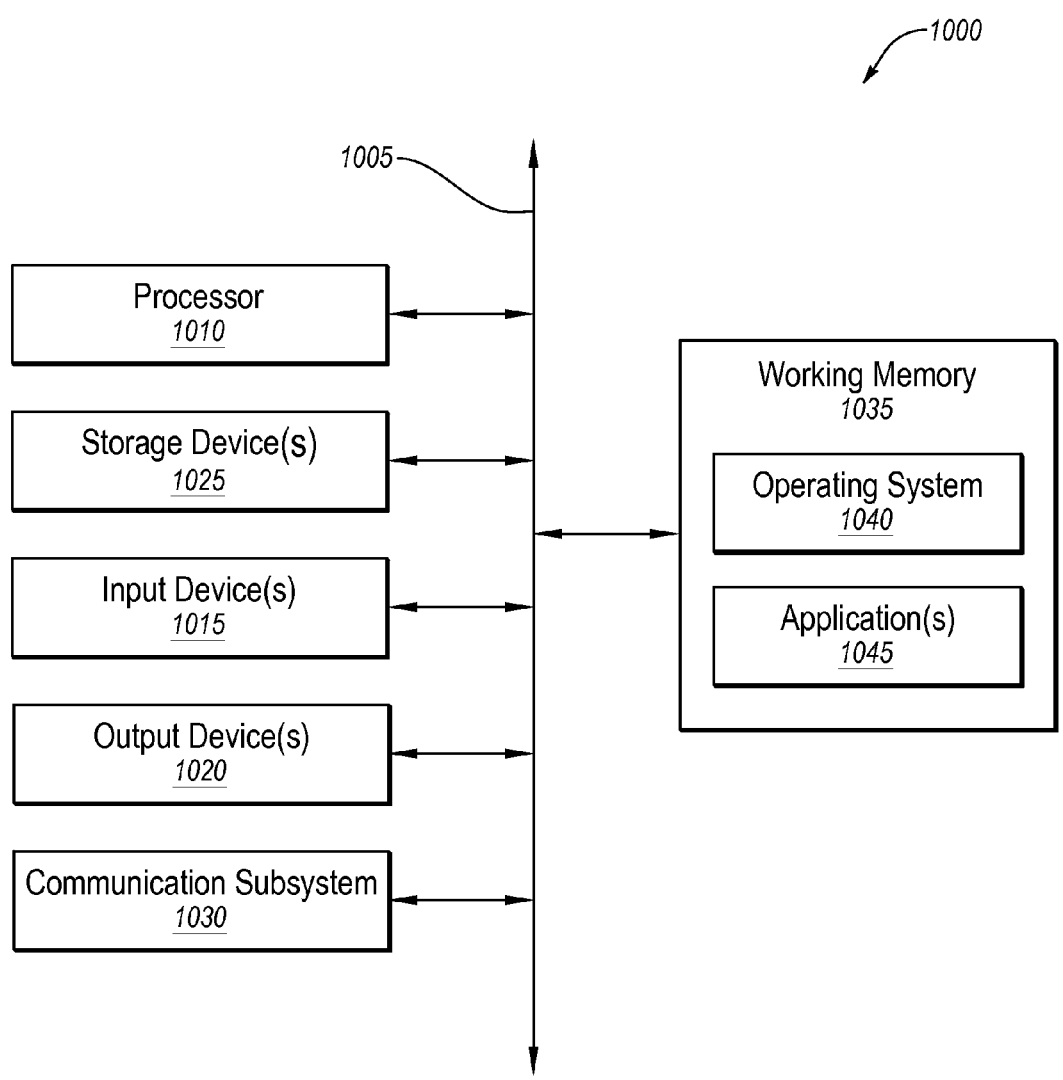
FIG. 10 shows an illustrative computational system for performing functionality to facilitate implementation of embodiments described herein.

A computational system 1000 (or processing unit) illustrated in FIG. 10 can be used to perform any of the embodiments of the invention. For example, the computational system 1000 can be used alone or in conjunction with other components to execute all or parts of the processes described above. As another example, the computational system 1000 can be used to perform any calculation, solve any equation, perform any identification, and/or make any determination described here. The computational system 1000 includes hardware elements that can be electrically coupled via a bus 1005 (or may otherwise be in communication, as appropriate). The hardware elements can include one or more processors 1010, including, without limitation, one or more general purpose processors and/or one or more special purpose processors (such as digital signal processing chips, graphics acceleration chips, and/or the like); one or more input devices 1015, which can include, without limitation, a mouse, a keyboard, and/or the like; and one or more output devices 1020, which can include, without limitation, a display device, a printer, and/or the like.

The computational system 1000 may further include (and/or be in communication with) one or more storage devices 1025, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 1000 might also include a communications subsystem 1030, which can include, without limitation, a modem, a network card (wireless or wired), an infrared communication device, a wireless communication device, and/or chipset (such as a Bluetooth device, an 802.6 device, a Wi-Fi device, a WiMax device, cellular communication facilities, etc.), and/or the like. The communications subsystem 1030 may permit data to be exchanged with a network (such as the network described below, to name one example) and/or any other devices described herein. In many embodiments, the computational system 1000 will further include a working memory 1035, which can include a RAM or ROM device, as described above.

The computational system 1000 also can include software elements, shown as being currently located within the working memory 1035, including an operating system 1040 and/or other code, such as one or more application programs 1045, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1025 described above.

In some cases, the storage medium might be incorporated within the computational system 1000 or in communication with the computational system 1000. In other embodiments, the storage medium might be separate from the computational system 1000 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 1000 and/or might take the form of source and/or installable code, which, upon compilation and/or installation on the computational system 1000 (e.g., using any of a variety of generally available compilers, installation programs, compression/decompression utilities, etc.), then takes the form of executable code.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it would be understood that the various changes, substitutions, and alterations could be made hereto without departing from the spirit and scope of the invention.

What is claimed is:

1. A modular camera expansion system comprising:
    a modular camera assembly including:
        a lens;
        a modular camera processor connected to the lens and which is configured to capture the digital video, audio, and photograph data;
        a wireless communicator connected to the modular camera processor and configured to connect with a wireless network to send and receive data from an external computing device;
        an antenna connected to the modular camera processor and configured to receive a radio frequency (RF) signal carrying a GPS source signal;
        a modular camera connector; and
        a modular camera assembly cover which encloses the modular camera processor, wireless communicator, antenna, with the lens and modular connector formed in an exterior surface thereof;
    a modular camera housing including:
        a housing processor;
        a connector configured to electrically and mechanically connect to the modular camera so as to connect the housing processor to the processor of the modular camera;
        a user interface connected to the housing processor which is capable of initiating a process in the modular camera processor when the modular camera is connected to the modular camera housing;
        a housing which houses the housing processor, connector, and user interface, the housing being configured to couple with the modular camera to form an assembled camera whereby the user interface of the modular camera expansion system is used to operate the modular camera, the connector being formed in an interior surface of the housing,
    wherein the modular camera processor extends from a back surface of the lens portion to the modular camera connector when the modular camera housing is coupled with the modular camera, such that when the housing is coupled with the modular camera, the housing extends to the back surface of the lens and encloses the modular camera processor.

2. The modular camera expansion system of claim 1, the modular camera housing further comprising a means for communicating with an external computing device.

3. The modular camera expansion system of claim 2, wherein the means for communicating with an external computing device comprises a USB port, mini USB port or micro USB port.

4. The modular camera expansion system of claim 1, the modular camera housing further comprising a battery for supplying power to the housing processor and the modular camera, wherein the battery is housed in the same housing as the housing processor, connector, and user interface.

5. The modular camera expansion system of claim 1, wherein the user interface comprises a button which causes the modular camera processor of the to initiate the capture of digital video, audio, or photographic data.

6. The modular camera expansion system of claim 1, the modular camera assembly further comprising at least one microphone capable of capturing digital audio data corresponding to the digital video data.

7. The modular camera expansion system of claim 1, wherein the connector comprises an electrical pin connector which connects to a corresponding electrical pin connector of the modular camera assembly comprising the modular camera connector.

8. The modular camera expansion system of claim 1, wherein each of the modular camera housing and modular camera assembly are waterproof.

9. A modular camera expansion product comprising:
    a modular camera assembly including:
        a lens;
        a modular camera processor connected to the lens and which is configured to capture the digital video, audio, and photograph data;
        a wireless communicator connected to the modular camera processor and configured to connect with a wireless network to send and receive data from an external computing device;
        an antenna connected to the modular camera processor and configured to receive a radio frequency (RF) signal carrying a GPS source signal;
        a modular camera connector; and
        a modular camera assembly cover which encloses the modular camera processor, wireless communicator, antenna, with the lens and modular connector formed in an exterior surface thereof;
    a modular camera housing including:
        a housing processor;
        a connector configured to electrically and mechanically connect to the modular camera so as to connect the housing processor to the processor of the modular camera;
        a user interface connected to the housing processor which is capable of initiating a process in the modular camera processor when the modular camera is connected to the modular camera housing;
        a housing which houses the housing processor, connector, and user interface, the housing being configured to couple with the modular camera to form an assembled camera whereby the user interface of the modular camera expansion system is used to operate the modular camera, the connector being formed in an interior surface of the housing,
    wherein the modular camera processor extends from a back surface of the lens portion to the modular camera connector when the modular camera housing is coupled with the modular camera, such that when the housing is coupled with the modular camera, the housing extends to the back surface of the lens and encloses the modular camera processor.

10. The modular camera product of claim 9, the modular camera housing further comprising a means for communicating with an external computing device.

11. The modular camera product of claim 10, wherein the means for communicating with an external computing device comprises a USB port, mini USB port or micro USB port.

12. The modular camera product of claim 9, the modular camera housing further comprising a battery for supplying power to the housing processor and the modular camera, wherein the battery is housed in the same housing as the housing processor, connector, and user interface.

13. The modular camera product of claim 9, wherein the user interface comprises a button which causes the modular camera processor to initiate the capture of digital video and photographic data.

14. The modular camera product of claim 9, the modular camera assembly further comprising at least one microphone capable of capturing digital audio data corresponding to the digital video data.

15. The modular camera product of claim 9, wherein the connector comprises an electrical pin connector which connects to a corresponding electrical pin connector of the modular camera assembly comprising the modular camera connector.

16. The modular camera product of claim 9, wherein each of the modular camera housing and modular camera assembly are waterproof.

17. A modular camera system comprising:
a modular camera assembly including:
 a lens;
 a modular camera processor connected to the lens and which is configured to capture the digital video, audio, and photograph data;
 a wireless communicator connected to the modular camera processor and configured to connect with a wireless network to send and receive data from an external computing device;
 an antenna connected to the modular camera processor and configured to receive a radio frequency (RF) signal carrying a GPS source signal; and
 a modular camera assembly cover which encloses the modular camera processor, wireless communicator, antenna, with the lens and modular connector formed in an exterior surface thereof;
 a modular camera connector;
a first modular expansion system comprising a first processor, a first connector configured to electrically and mechanically connect the first processor to the modular camera processor, a first user interface connected to the first processor which is capable of initiating a process in the modular camera processor when the modular camera assembly is connected to the first modular expansion system, and a first housing which houses the first processor, first connector, and first user interface, the housing being configured to couple with the modular camera assembly to form a first assembled camera whereby the first user interface is used to operate the modular camera assembly, the first connector being formed in an interior surface of the first housing; and
a second modular expansion system comprising a second processor, a second connector configured to electrically and mechanically connect the second processor to the modular camera processor, a second user interface connected to the second processor which is capable of initiating a process in the modular camera processor of the when the modular camera assembly is connected to the second modular expansion system, and a second housing which houses the second processor, second connector, and second user interface, the second housing being configured to couple with the modular camera assembly to form a second assembled camera whereby the second user interface is used to operate the modular camera assembly, the second connector being formed in an interior surface of the second housing;
wherein the modular camera processor extends from a back surface of the lens portion to the modular camera connector when the modular camera assembly is connected to each of the first housing and second housing, such that when the first housing or second housing are coupled with the modular camera assembly, each of the first housing and the second housing extends to the back surface of the lens and encloses the modular camera processor.

18. The modular camera system of claim 17, wherein the first modular expansion system comprises a first battery which has a larger capacity of a second battery of the second modular housing.

19. The modular camera system of claim 17, wherein the first and second connectors each comprise an electrical pin connector which connects to a corresponding electrical pin connector of the modular camera assembly comprising the modular camera connector.

20. The modular camera system of claim 17, wherein the first modular expansion camera system, second expansion camera system, and modular camera assembly are each waterproof.

* * * * *